(12) United States Patent
Stirk

(10) Patent No.: US 7,239,694 B2
(45) Date of Patent: Jul. 3, 2007

(54) INTEGRATED CIRCUIT CONFIGURATIONS AND METHODS FOR PROVIDING FUNCTIONS FOR PUBLIC TELEPHONES

(75) Inventor: Gary Lee Stirk, Lakeland, FL (US)

(73) Assignee: Protel, Inc., Lakeland, FL (US)

( * ) Notice: Subject to any disclaimer, the term of this patent is extended or adjusted under 35 U.S.C. 154(b) by 987 days.

(21) Appl. No.: 09/897,714

(22) Filed: Jul. 2, 2001

(65) Prior Publication Data

US 2002/0054612 A1    May 9, 2002

Related U.S. Application Data

(60) Provisional application No. 60/215,250, filed on Jun. 30, 2000.

(51) Int. Cl.
*H04M 1/00* (2006.01)

(52) U.S. Cl. .......................... 379/387.01; 379/387.01; 379/388.06

(58) Field of Classification Search ........... 379/387.01, 379/388.06
See application file for complete search history.

(56) References Cited

U.S. PATENT DOCUMENTS 5,557,670 A * 9/1996 Perry et al. ................. 379/398
6,728,366 B1 * 4/2004 Barkaro et al. ............. 379/395

* cited by examiner

*Primary Examiner*—Jefferey Harold
(74) *Attorney, Agent, or Firm*—Allen, Dyer, Doppelt, Milbrath & Gilchrist, P.A.

(57) ABSTRACT

Circuit configurations designed for use with public telephones to provide standard telephone functions with higher reliability, lower cost, and lower packaging densities, include first and second channel means for providing both transmit and receive multiplexing control, a one-wire compatible user interface, and embedded PIC microcontroller for both digital control and monitoring of analog measurement and multiplexing circuits, and bitstream format conversion techniques.

18 Claims, 8 Drawing Sheets

| Pin | Name | Pin | Name |
|---|---|---|---|
| 1 | CLK | 28 | $D_{I/O1}$ |
| 2 | $M_{RST}$ | 27 | $D_{I/O2}$ |
| 3 | $T_x R_x$ | 26 | $D_{I/O3}$ |
| 4 | IRQ | 25 | $MOD_{out}$ |
| 5 | $FIR_{CLK}$ | 24 | RXC |
| 6 | SYNTH | 23 | $RX_{out}$ |
| 7 | $D_{VSS}$ | 22 | $TX_{out}$ |
| 8 | RCV | 21 | $D_{VDD}$ |
| 9 | XMTR | 20 | $A_{VDD}$ |
| 10 | DTMF | 19 | $A_{REF}$ |
| 11 | Modem | 18 | $A_{IN0}$ |
| 12 | AUX | 17 | $A_{IN1}$ |
| 13 | $V_{REF}$ | 16 | $A_{IN2}$ |
| 14 | $A_{VSS}$ | 15 | $A_{IN3}$ |

Figure 1

Audio selection for Receive circuits

Audio selection for Transmit circuits

Figure 7
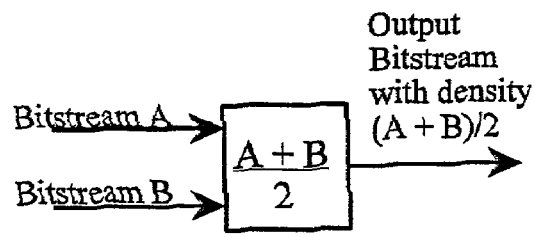
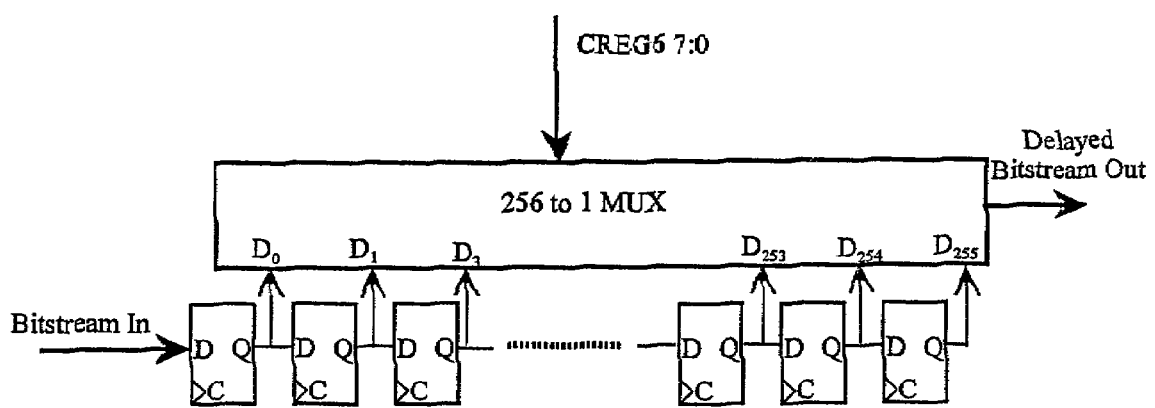
Figure 8

INTEGRATED CIRCUIT CONFIGURATIONS AND METHODS FOR PROVIDING FUNCTIONS FOR PUBLIC TELEPHONES

CROSS-REFERENCE TO RELATED APPLICATION

This application claims the benefit of U.S. Provisional Application Ser. No. 60/215,250, filed Jun. 30, 2000, the disclosure of which is incorporated by reference herein in its entirety.

BACKGROUND OF THE INVENTION

In the design of public telephones, discrete semiconductor technology has been used in the past for providing standard telephone functions. However, there is a need for integrated circuit configurations and methods that provide these standard telephone functions with higher reliability, lower cost, and lower packaging density than has been available in the past using discrete technology.

SUMMARY OF THE INVENTION

The present invention are circuit configurations designed for use with public telephones that function together to provide standard telephone functions with higher reliability, lower cost, and lower packaging density than what has been provided using discrete technology.

Among other features, the circuit configurations provide two channels of audio control. The first channel is designated as a transmit multiplexing (mux) control and the second as a receive mux control. Also included is a single wire, multi-protocol compatible user interface and an imbedded microcontroller for both digital control and monitoring of the analog measurement and multiplexing circuits. Other key features of the present invention include:
  Built-In Silicon Serial Number
  Digitally Programmable Gain Control
  Four Analog Audio Inputs
  Four System Analog Inputs
  Dual Audio Outputs
  Audio and FSK Sidetone Cancellation
  Three General Purpose Digital I/O
  Industry 28 Pin SOIC Package The circuits function to provide both signal selection and gain control for a variety of audio frequency, digital, and analog inputs. The audio output signals are selected and scaled by on chip control logic to direct the appropriate audio input to the desired output. Two audio outputs are provided—one is typically associated with the receiver circuits and the other is usually associated with the transmit circuits in payphone applications.

Both the transmit and receive mux control circuits have two basic types of audio inputs; analog audio inputs and bitstream inputs. The analog inputs, when selected, may be scaled via an internal programmable gain switched capacitor amplifier and are then converted into a bitstream format via an on chip second order delta sigma modulator.

The digital control is accomplished via a single-wire interface. Signaling using this interface will not contend with other Dallas compatible devices on the same one-wire bus. This serial port is used for all digital control for the circuits including signal selection, gain control, phase control as well as miscellaneous chip configuration and status information. The signals selected for output on the $RX_{OUT}$ and $TX_{OUT}$ outputs are buffered before leaving the chip.

Also included is a circuit which will effectively cancel the FSK carrier tone transmitted from the phone, thus allowing accurate recovery of the incoming FSK Data. This is accomplished via an adaptive side tone cancellation circuit also included within the circuits. Further details are included in the description of operation section of this document. This approach will involve firmware interaction and control but together they should provide an optimal solution allowing full duplex Bell 103 FSK communication.

Any of the modulated signals may, via the control section, be attenuated digitally by shared gain control logic. This allows volume/level control on any of the modulated signals. The gains will be settable in 16 increments from 0 to full scale. This attenuation will be scaled so that perceived attenuation is linear (i.e., perceived sound will decrease linearly not actual signal level). This should allow a more pleasing operation to the user.

The transmit mux output is the selection of the five audio inputs: transmit, modem, DTMF, voice synthesis, and one auxiliary input. By use of digital selection control, via an on chip serial interface circuit, any one of these inputs may be selected for output onto the ICA0000035 transmit output pin. Each of these input signals is described in more detail in later sections of this specification.

The receive mux output is the selection of one of three audio inputs: line inputs, DTMF, and voice synthesis. As in the transmit mux control these inputs are also controlled via serial interface digital selection logic. In addition to the audio inputs each of the two output muxes may also select a DC reference voltage which is internal to the chip and brought out on a pin for use by other phone circuits.

The digital control is accomplished via a synchronous serial interface. In one specific example, this interface utilizes one pin and employs a single wire signaling protocol. This serial port is used for all digital control for the circuits including signal selection, gain control, as well as miscellaneous chip configuration information. The signals selected for output on the $RX_{OUT}$ and $TX_{OUT}$ outputs are buffered by an operational amplifier before leaving the chip.

The circuits also contain an internal tone generation circuit which can be used for (processor independent) DTMF tone generation. The tones and the levels (twist) are completely programmable via the one-wire interface.

BRIEF DESCRIPTION OF THE DRAWINGS

FIG. 1 illustrates schematically an Application Specific Integrated Circuit (ASIC) in accordance with the present invention, in which connector pins of the ASIC are numbered corresponding to descriptions set out below.

FIG. 7 is a simplified diagram of a bitstream adder.

FIG. 8 is a functional block diagram of a bitstream delay circuit.

DETAILED DESCRIPTION

Figure 2:
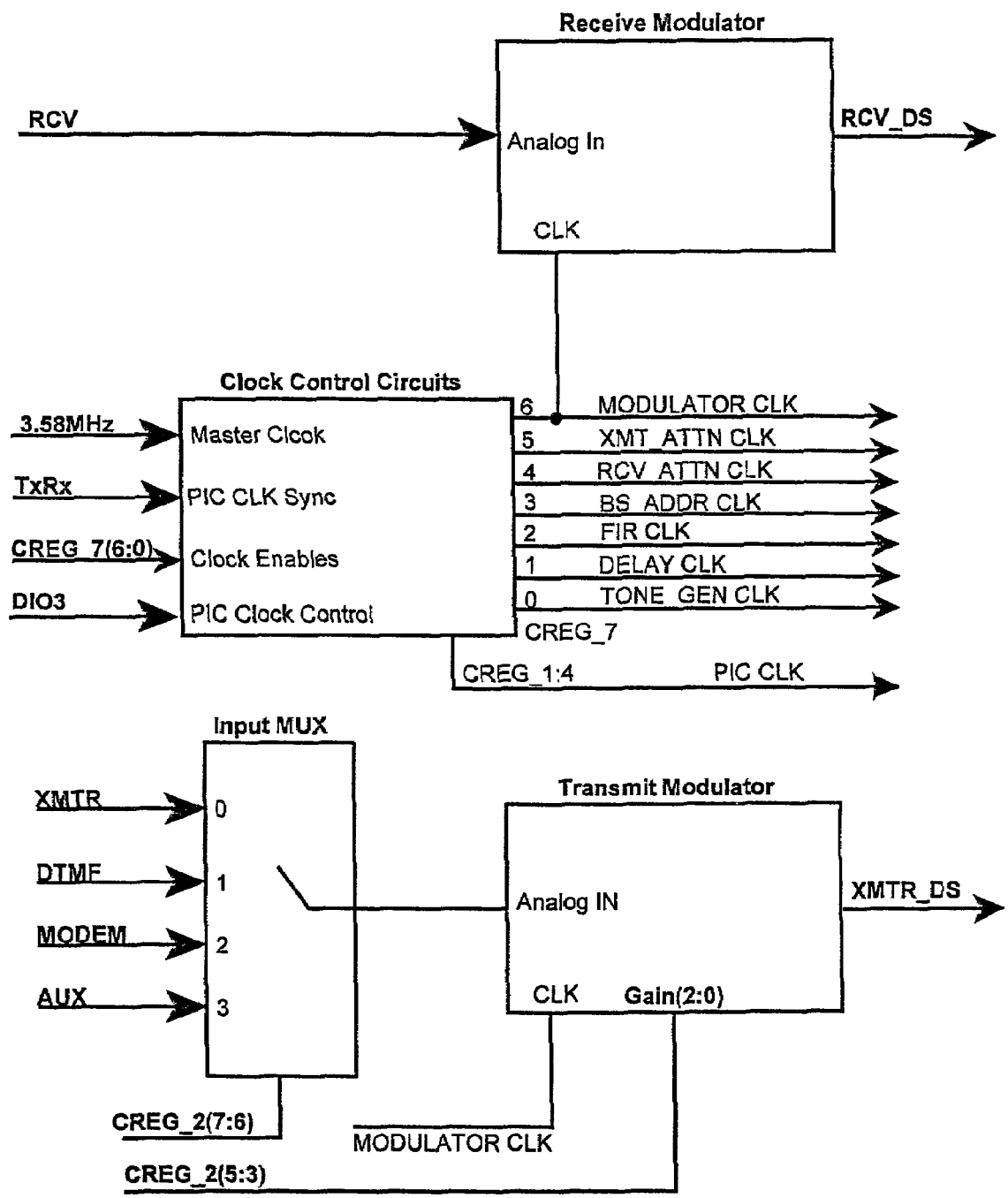
FIGS. 2A and 2B are related circuit diagrams, shown in block form, of the ASIC of FIG. 1.

A preferred embodiment of the present invention will now be described with reference to the drawings. In the following description, particular reference is made to one specific circuit configuration—the ICA0000035—used by the assignee of the present invention. It will of course be understood by those skilled in the art that various modifications may be made in the design of the audio mux ASIC without departing from the spirit and scope of the present invention.

One version of the ASIC of the present invention, shown schematically in FIG. 1, contains 28 pins which are described next.

Pin Descriptions

| PIN | Mnemonic | Function |
|---|---|---|
| 1 | CLK | This input is the master system clock for the ICA0000035 circuits. It is used for the internal microcontroller core clock and also is divided down by four for to generate the internal sampling clock for the delta sigma circuits. The phased clocks reqquired for internal switched capacitor circuits also is derived from this clock. |
| 2 | $M_{RST}$ | This input is aserted every time the ICA0000035 circuit is powered-up this signal will initialize all critical internal registers and counters. It also will reset the program counter of the internal microcontroller to address '00'h |
| 3 | $T_xR_x$ | This is the input/output signal which is used to communicate with the ICA0000035 internal microcontroller. The signal is compatible with a single wire communication protocol timing described later in this document. It is an open-drain bidirectional signal. External pullup of 4.7k us required for proper operation. |
| 4 | IRQ | Interupt input for embedded PIC microcontroller. This interupt may be level or edge triggered low or high true under program control. |
| 5 | $FIR_{CLK}$ | This input is normally bumpered to IRQ and $T_xR_x$ so that the FIR circuit can interrupt the embedded PlC during Modem operation. |
| 6 | SYNTH | This analog input is an input which is internally filtered and scaled filtered. It available through mux selection at either the TX output or the RCVR output. One level of filtered SYNTH signal is available at the TX output and three levels are available for output at the $RX_{OUT}$ output pin. |
| 7 | $D_{VSS}$ | Digital ground signal return. |
| 8 | RCV | This input is buffered by a pre-amp and provides an unfiltered gain output if selected at four different gain levels. The actual gain selected is selected by the microcontroller via the one wire interface. |
| 9 | XMTR | This input is buffered by a pre-amp and provides an unfiltered gain output if selected at four different gain levels. The actual gain selected is selected by the microcontroller via the one wire interface. |
| 10 | DTMF | This signal is normally the DTMF signal from the micro ASIC (40A). Like the MODEM signal, this input may be selected for output without modulation. Optionally an internal DTMF generation circuit may be selected which would output a separate, modulated, DTMF signal independent of this DTMF input. |
| 11 | Modem | This input accepts a Modem input for multiplexed selection to the TX output. When selected it is unfiltered and fed directly to the TX output. It is not modulated like other audio inputs. |
| 12 | AUX | Auxiliary audio input. This input is filtered and gained to three different levels for selection at the $RX_{OUT}$. output and filtered and gained at one level for output to the TX output. See Table 1 for signal details. |
| 13 | $V_{REF}$ | Internal Voltage reference used for internal biasing of amplifiers. This output may be used by external circuits but must be buffered if it is to drive any loads>10 microamps. |
| 14 | $A_{VSS}$ | Analog signal ground. |
| 15 | $A_{IN3}$ | General purpose analog input for system measurement functions. |
| 16 | $A_{IN2}$ | General purpose analog input for system measurement functions. |
| 17 | $A_{IN1}$ | General purpose analog input for system measurement functions. |
| 18 | $A_{IN0}$ | General purpose analog input for system measurement functions. |
| 19 | $A_{REF}$ | This pin is an output which is set under program control by the embedded PlC microcontroller formware. It is used as a reference to compare to other general purpose analog inputs. |
| 20 | $A_{VDD}$ | Analog supply for linear circuits |
| 21 | $D_{VDD}$ | Digital supply for logic circuits |
| 22 | $RX_{OUT}$ | This is on of two mux outputs for different audio inputs. It is generally used to output a scaled and filtered audio input and feed it to the phone receiver (handset). This is an audio output but is in bitstream form and therefore must be filtered using a second or third order filter. |
| 23 | $TX_{OUT}$ | This is on of two mux outputs for different audio inputs. It is generally used to output a scaled and filtered audio input and feed it to the phone transmit circuits (line). This is an audio output but is in bitstream form and therefore must be filtered using a second filter which can also perform line impedance matching. A simple LRC filter has been developed for this purpose and presented in the interface requirements section of this document in this document |
| 24 | RXC | This output provides zero crossing information if an incoming audio tone. In the case where this output is being used for modem carrier, mark or space detection additional internal circuitry is provided which will cancel any carrier side tones that may be present. |

-continued

| PIN | Mnemonic | Function |
|---|---|---|
| 25 | $MOD_{OUT}$ | Digital bitstream output of a general purpose Digital/Analog delta-sigma bitstream. The analog value of this bitstream output is determined by the value written to PORTC of the internal PIC microcontroller. This value is written via the one wire serial interface. |
| 26 | $D_{I/O3}$ | General purpose Digital I/O point. This input/Output pin may be used as an input1 output or bidirection I/O as programmed by the microcontroller via the one wire serial interface. If bit 4 of CREG1 is '0' then this pin is used to control the PIC clock. A high enables the clock input and a low will drop the clock input frequency by 64,536 thus reducing the CPU poer by 65,536. |
| 27 | $D_{I/O2}$ | General purpose Digital I/O point. This input/Output pin may be used as an input, output or bidirection I/O as programmed by the microcontroller via the one wire serial interface. |
| 28 | $D_{I/O1}$ | General purpose Digital I/O point. This input/Output pin may be used as an input, output or bidirection I/O as programmed by the microcontroller via the one wire serial interface. |

ABSOLUTE MAXIMUM RATINGS

| | | |
|---|---|---|
| $A_{VDD}$ AND $D_{VDD}$ to $A_{VSS}$ | −0.3 to +11.0 | Volts |
| $D_{VDD}$ to $D_{VSS}$ | −0.3 to +6.0 | Volts |
| $A_{VDD}$ to $D_{VDD}$ | >−0.3 | Volts |
| Analog input voltage | $A_{VSS}$ −0.3 to $A_{VDD}$ +0.3 | Volts |
| Digital input voltage | $D_{VSS}$ −0.3 to $D_{VDD}$ +0.3 | Volts |
| Input current, continuous on any pin | ±10 | ma |
| Input current, transient on any pin | ±100 | ma |
| Operating Temperature | −40° to +80° | ° C. |
| Storage Temperature | −55° to +125° | ° C. |
| Lead Temperature Soldering (10 seconds) | +300° | ° C. |
| Power dissipation to 70° C. | 500 | mWatts |

Description of Operation

Section 1.0—General Description

The purpose of the ICA000035 circuit is to provide selection and conditioning of audio signals in Protel's payphones. These signals are divided into two categories, receive circuits and transmit circuits. The receive circuits are those that eventually get transmitted (via the $RX_{OUT}$ pin) to the handset receive device (ear piece). Signals that are available for output on to the handset receive circuits are:

| | |
|---|---|
| RCV | Audio signal from the phone line interface |
| DTMF | Confidence tone for phone generated DTMF signaling, and |
| SYNTH | Voice synthesis signal form ICD0000050A ASIC. |
| AUX | An auxiliary analog input to the chip |
| TONE | Output from an onchip Dual tone Generator |
| XMTR | Transmitter signal fed back to the receiver (typically for sidetone) |

Transmit circuits are those that eventually are output (via the $TX_{OUT}$ pin ) to the two-to-four-wire phone line interface. Signals that are available for output to the two-to-four-wire phone line interface are:

| | |
|---|---|
| MODEM | Direct feed-through of modem output signal |
| DTMF | Direct analog signal from the 6502 DTMF generator or modulated form of this signal from this chips internal modulation and signal selection circuits. |

-continued

| | |
|---|---|
| XMTR | Modulated form of the signal from the handset transmit device (mouth-piece). |
| AUX | Auxiliary audio input, modulated and available for output to the transmit circuits. |
| TONE | Output from an onchip Dual tone Generator |

Figure 2B:
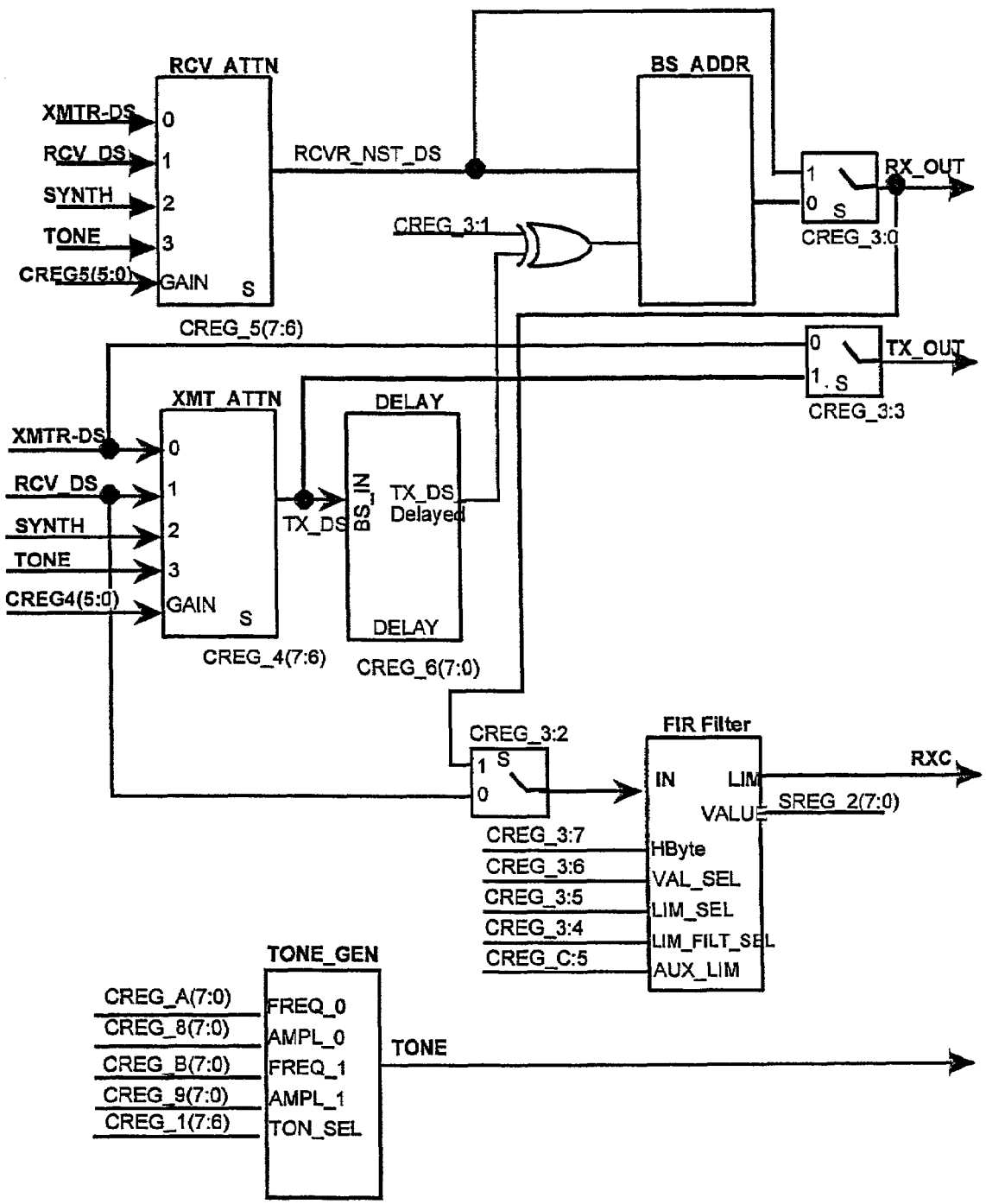
Figure 3:
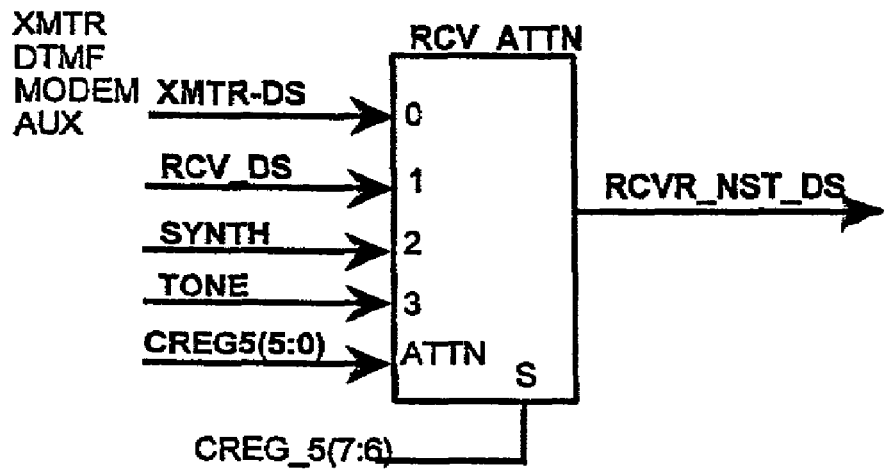
FIG. 3 is a block diagram for "audio selection for receive" circuits.
Figure 4A:
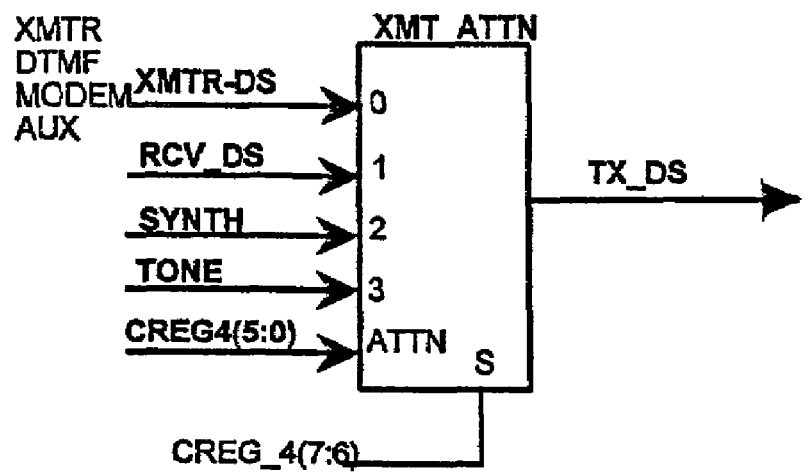
FIG. 4A is a block diagram for "audio selection for transmit" circuits.
Figure 4B:
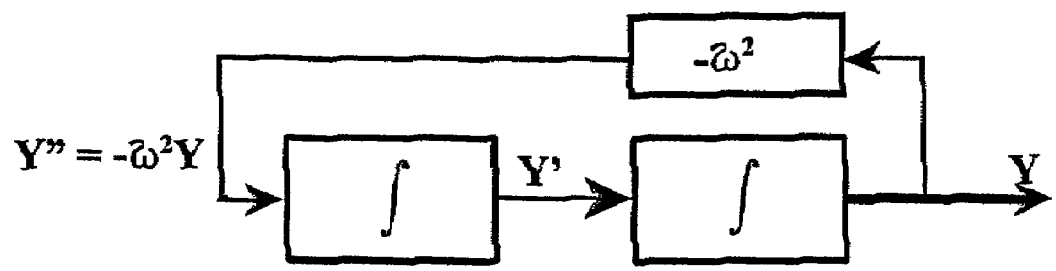
FIG. 4B is a block diagram of a dual tone generator circuit.

FIGS. 2a and 2b provide a detailed block diagram of the ICA000035 internal circuits and FIGS. 3 and 4 show the details of receive and transmit selection circuits. The design philosophy chosen for this design was to transform audio inputs into digital bitstreams that have ben noise shaped using delta-sigma technology. This approach will allow for easy and area efficient manipulation of the audio analog signals. Any mention in the rest of this document to bitstreams will mean an analog signal that has been noise shaped using delta-sigma technology.

The heart of the control of the analog signals is provided by an imbedded microcontroller that has been customized for the specific requirements of the ICA0000035 circuits. See section 3 for detailed description of the imbedded microcontroller. One of its primary purposes, however, is to provide the command interpretation for signals present on the one-wire chip interface. The one wire interface is described in Section 4 of this document.

All communication with the ICA0000035 circuits is performed over this interface. Microcode to provide this functionality is permanently programmed into the chip via on board ROM circuits. Refer to section two for details on the interface protocol. Additional code may be 'downloaded' via this same interface into on chip RAM which will allow the user to modify existing code or add additional code for the imbedded microcontroller. Other, on chip, non-audio circuits which provide added capabilities are described in section 1.4 of this document.

The signal selection is defined by the Tables below:

Analog signal selection (output on TS_DS)

| $CR2_7$ | $CR2_6$ | INPUT SELECTED |
|---|---|---|
| 0 | 0 | XMTR |
| 0 | 1 | DTMF |
| 1 | 0 | MODEM |
| 1 | 1 | AUX | transmit Signal Selection Table

| CR4$_7$ | CR4$_6$ | XMT signal selected |
|---|---|---|
| 0 | 0 | XMTR_DS |
| 0 | 1 | RCV_DS |
| 1 | 0 | SYNTH |
| 1 | 1 | TONE |

Recieve Signal Selection Table

| CR5$_7$ | CR5$_6$ | RCV Signal Selected |
|---|---|---|
| 0 | 0 | XMTR_DS |
| 0 | 1 | RCV_DS |
| 1 | 0 | SYNTH |
| 1 | 1 | TONE |

Note, that the selected bitstreams may be additionally attenuated via Control Register bits CR4$_{5.3}$ and CR5$_{5.3}$ for the. This attenuation is described in more detail in section 2.1 of this document. The final output bitstream is filtered by a passive LRC two pole lowpass filter which is designed to provide line impedance matching (600 ohm) as well as noise filtering, Section 1.3 Bitstream Processing Circuits Additional signal selection is provided for both the transmit and receive circuits before the TX_$_{OUT}$ and RX_$_{OUT}$ signals are output from the chip. For the transmit circuit the TX_DS output may be directly output by setting bit 3 of control register 3 to a '0' state. Setting this bit to a '1' will select the transmit bitstream attenuator output as the signal to be output on the TX_$_{OUT}$ pin. This option is provided primarily for Full duplex FSK modem operation where dual use of the XMTR output is required. (See description of modem operation in this section below). Normally bit 3 of control register 3 is set high and the transmit bitstream attenuator is selected for output to the TX_$_{OUT}$ pin.

Analog Source Characteristics

Section 1.0.1—Analog Source Characteristics

As described above the ICA0000035 circuit functions to provide signal conditioning and selection of 10 different audio signal types. These signals are AUX, DTMF, RCV, Modem, SYNTH, XMTR, and A$_{IN0}$ ... A$_{IN3}$. Table 1 below provides a description of these signal characteristics.

Section 1.1 Audio Input Selection Multiplex Circuits

Audio input selection multiplexers are provided on the chip for selection of both analog audio inputs as well as off-chip and on-chip bitstream generated audio signals. Sections 1.2 and 1.3 describe the details of these signal selection for the TX$_{OUT}$ and RX$_{OUT}$ circuits.

Section 1.2 Audio Selection Circuits

FIGS. 3 and 4 show details of the signal flow for audio input signals that may be selected for output on the TX$_{OUT}$ and RX$_{OUT}$ output pin. The TX$_{OUT}$ pin is connected to a passive LRC filter for noise filtering if the output signal or bitstream.

As shown seven audio input selections may be made. Five of these signals are input into the chip as analog and then modulated before being fed to the Digital signal selection logic. Tw of the signals are in digital (bitstream form). The first is the SYNTH pin which is a bitstream signal for voice encoding from the Protel 50A series ASIC the other is a bitstream output from an on-chip dual tone generator. The selection of these signals are controller by Control Register 4 Bits 7 and 6 for the transmit circuits and Control register 5 bits 7 and 6 for the receive signal selection. The analog inputs are selected by controlling Control register 2 bits 7 and 6.

Additionally the RX$_{OUT}$ circuits allow for side-tone cancellation. This is accomplished as shown in FIG. 2 by adding in a portion of the audio signal being output to the line to the receive circuits. Control Register bit CR5$_7$ determines whether or not the side tone circuit is used, see table below:

| Function | CR3$_0$ |
|---|---|
| No Side-Tone | 1 |
| Side-Tone | 0 |

The level of the sidetone is controlled by the bitstream delay register (control register 6–7:0) and phase control bit (bit 1 of control register 3). Normally this bit is set to a '1' so that the bitstream adder subtracts a scaled portion of the transmit signal from the incoming receive In the case where the Protel 65C02 microprocessor is being used to perform 300/1200 FSK modem operation this sidetone circuit may be used for carrier cancellation. The operation is as follows, DTMF is transmitted by the 65C02, the transmit selection logic selects the DTMF in its bitstream form. This bitstream is selected and attenutated and delayed

| Source Name | Signal Level | Voltage Type | Frequency | Source Impedance |
|---|---|---|---|---|
| AUX | 2.5 Volts | AC - Sine Wave | 660 Hz to 1.6 Khz | ≈200K Ohms |
| DTMF | 2.5 Volt p-p | AC - Sine Wave | 600 Hz to 1.6 KHz | <100 Ohms |
| RCV | 3.0 volts | Audio | Voice (BW = 3 Khz) | <100 Ohms |
| Modem | 5 volts | AC Sine Wave | <2400 Hz | <100 Ohms |
| SYNTH | 5 Volt | Bitstream | 890 KHz(BW = 3 KHz) | <100 Ohms |
| XMTR | <500 mv | Audio | 600 Hz to 1.6 KHz | <100 Ohms |
| A$_{IN0}$ ... A$_{IN3}$ | .5 to A$_{VDD}$−.5 | Analog | <100 Hz | <1K Ohms | such that when it is added back to the RCV signal it exactly cancels that portion of the RCV signal that is due to the transmitted carrier. This nulled RCV signal is then FIR filtered by the limiter circuit of FIG. 3 and the RXC signal is output which is an indication of the phase of the nulled and filtered RCV signal.

Section 1.4 Additional General Purpose Circuits

In addition to selection control of audio input and output circuits, the IDA0000035 design also provides an auxiliary A/D circuit independent of the audio circuits. This circuit is four channel A/D measurement circuit and its operation is described below.

1.4.1 Four Channel A/D Circuit

The four channel A/D measurement circuit is comprised of a four-channel analog multiplexer circuit which selects one of four analog inputs. An additional input reference pin is provided to this circuit. This reference pin is typically connected to a low pass filtered version of on chip D/A modulator output(see below). The selected pin is successively compared with the current modulator D/A output. This D/A output is thus 'ramped' up or down until the comparitor trips. It is at this point that the current digital value in the D/A register may be read. The read value reflects the current value of the selected analog signal. Port mapping of the signal selection is as follows:

| Signal | $CRC_1$ | $CRC_0$ |
|---|---|---|
| $A_{IN1}$ | 0 | 0 |
| $A_{IN2}$ | 0 | 1 |
| $A_{IN3}$ | 1 | 0 |
| $A_{IN4}$ | 1 | 1 |

1.4.2 Three Spare Digital I/O lines

Three Digital I/O lines are also available for other phone functions. These signals are programmed and controlled via the one-wire serial interface. These pins are mapped to PORTA bits 0–2 of the imbedded microcontroller.

1.4.3 D/A Converter

An on chip DA converter is provided whose output is available to the $MOD_{OUT}$ pin of the ICA0000035 ASIC. This converter also uses second order delta-sigma modulation techniques.

Digital values written to PORT C of the imbedded PIC microcontroller are modulated into a second order noise shaped bitstream. This bitstream is the signal that is output on the $MOD_{OUT}$ pin. To recover the analog signal a simple multi-pole RC filter may be used.

1.4.4 Tone Generator

An on chip tone generator is provide for the user to use for future applications requiring a stable tone or sine wave generator. The sine wave generation does not use the standard look-up-table method. It is a circuit implementation of the solution to the differential equation for a sine wave give by $$Y = -1/\omega^2 \cdot \ddot{Y}$$

which can be rewritten as $$\ddot{Y} = -\omega^2 \cdot Y$$

which is the circuit shown in FIG. 4. The frequency is determined by the input divide-by-N clock divider and the sine wave circuit itself. The sine wave circuit has been designed so that there are 25.1 clocks per cycle. This is accomplished by accomplishing the $1/\omega^2$ multiplication of the output as a 4 bit shift. Therefore $$\omega^2 = 1/16,$$

This implies that $$\omega = 1/4,$$

From this we can determine the period as, $$T = 1/F = 2\pi \div \omega,$$

or $$T = 25.13 \text{ clocks.}$$

Therefore the frequency of the final sine wave is given by the inverse of the output of the divide-by-N counter times 25.13. Or $$F = CLK \cdot 1/[25.13 \cdot (N+1)].$$

Two of these sine wave generators are provide as part of the tone generation circuit. The value of N for each tone is set by control registers CRA and CRB. The amplitudes may be set by setting the initial condition on the first integrator of each tone generation circuit. The amplitude setting requires eight bits from control registers CR8 and CR9. The table below summarizes the use of control registers CR8, CR9, CRA and CRB for amplitude and frequency control of the two tone generators.

| Register | Function |
|---|---|
| $CRA_{7..0}$ | Frequency control tone generator 0 |
| $CRB_{7..0}$ | Frequency control tone generator 1 |
| $CR8_{7..4}$ | Amplitude control tone generator 0 |
| $CR9_{7..4}$ | Amplitude control tone generator 1 |

The tones from the on chip tone generator may be selected for output using the following selection logic:

| $CR1_{1:0}$ | Function |
|---|---|
| 00 | Output Tone0 + Tone1 |
| 01 | Output Tone 0 |
| 10 | Output Tone 1 |
| 11 | NO Tone (50% duty cycle) |

1.4.5 Clock Generation

Several on chip clocks are required to operate the circuit blocks described in this document. One master clock is provided to the chip and all internal clocks are derived from this single master clock. The required on chip clocks and their relationship to the master clock are summarized in the table below:

| Clock | Description |
|---|---|
| CLK | Imbedded PIC microcontroller CLK |
| PH1 | CLK ÷ 4 |
| PH1a | PH1 clock with trailing edge advanced |
| PH1b | PH1a clock with trailing edge advanced |
| PH2 | CLK ÷ 4, PH1 Inverted and non overlapping |
| PH2a | PH2 clock with trailing edge advanced |
| PH2b | PH2a clock with trailing edge advanced |
| BITCLK | CLK ÷ 4, Bitstream clock for Bitstream building blocks |

Figure 4C:
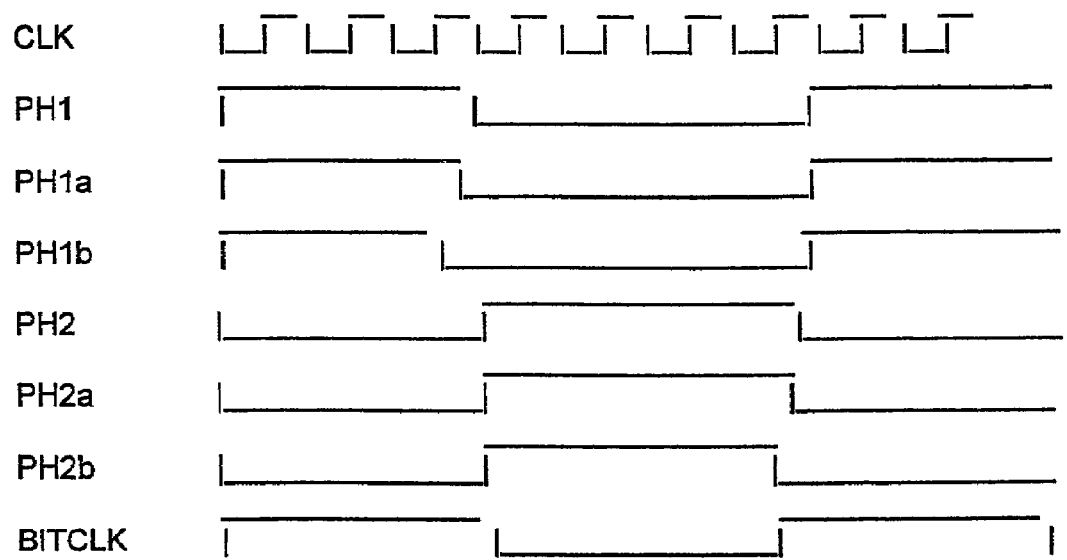
FIG. 4C is a timing diagram illustrating clock timing for the circuit configurations.

The timing diagrams of FIG. 4C show the clocks and their timing.

Section 2.0—Bitstream Building Blocks

All analog signals which are processed on-chip are converted to bitstream which are noise shaped. This conversion is accomplished via modulators which modulate analog signals into a bit-density modulated format whose nose characteristics are such that noise in the signal band is suppressed and out-of-band noise is shaped such that it increases at a rate of 15 db per octave.

It is important that as the signals are manipulated that noise shaping is maintained. On-ship bitstream function blocks are provided which will perform analog equivalent functions on the bitstreams without requiring the bitstreams to be converted to parallel data structures. This bitstream manipulation will maintain the required second order noise shaping of the original signal. The table below shows these building blocks (and the addition of the modulator) and their equivalent analog functions:

| Function | Analog equivalent function |
| --- | --- |
| Bitstream Modulator | Buffer/Gain Amplifier |
| Bitstream Attenuator | Potentiometer |
| Bitstream Adder | Summing Amplifier |
| Bitstream Delay | Phase shifter |
| Bitstream Comparator | Filter/Comparator |
| Tone Generator | Oscillator |

The sections below give detailed explanations of these building blocks as well as details on port mapping required for control and monitoring. It should be noted that, throughout the bitstream building block descriptions, the scaling is such that all one's is considered positive full scale, all zero's is considered negative full scale and 50% density (equal number of one's and zero's) is considered to have a signal value of zero.

Section 2.1 Bitstream Modulator

Figure 5:
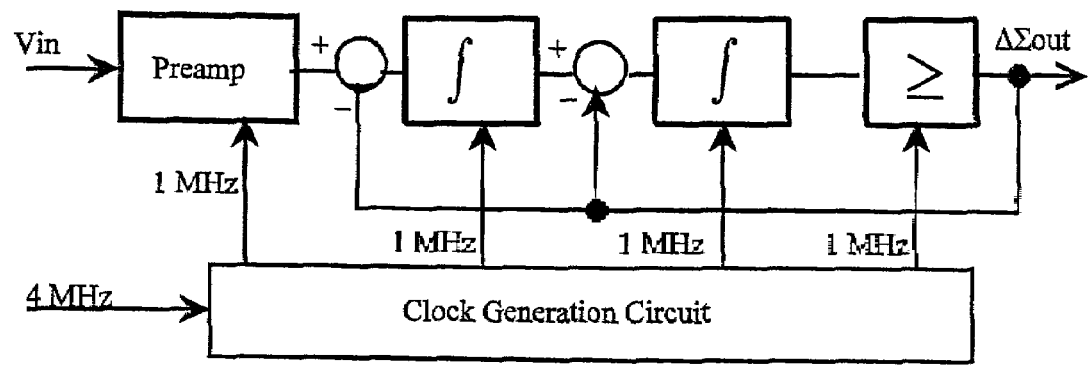
FIG. 5 is a block diagram for a bitstream modulator.

FIG. 5 show a block diagram of the Bitstream modulator. Two of these building blocks are provided on the ICA0000035 ASIC. One is dedicated for receive circuits and the other is dedicated for transmit signals. These modulators are identical in design with the exception of the specific port mapping used to control these modulators.

The modulators, as shown, may be partitioned into two stages. First a programmable gain stage is provide which will precondition the input signal for the proper dynamic range of the modulator. Second the pre-conditioned signal is then modulated with the second order delta-sigma modulator. The result is a bitstream output who's bit density is proportional the analog value. Scaling is such that an analog value of mid-reference will produce a 50% bit stream density.

The pre-amp is a switched capacitor, double sampled capacitive reset circuit. This circuit will cancel any circuit offsets, 1/F noise and errors due to finite amplifier gain to a first order approximation. Simulations show that these input signal errors are reduce by a factor of about −60 db or better. Non-overlapping and delayed phased clocks are provided to operate the switched capacitor circuits in a way so as to reduce the effects of charge injection as well. The clock timing is described in section 1.4.5 "Clock Generation".

Gain selection is the only control (other than clocks) required by the modulator block. This is accomplished via control register bits of the imbedded microcontroller. The tables below show the available gain selections and their corresponding control register bits for each of the two modulators.

| Transmit Modulator | | | | |
| --- | --- | --- | --- | --- |
| Gain | $CR2_5$ | $CR3_4$ | $CR3_4$ | Maximum Operating Input Range |
| 0.5 (−6 db) | 0 | 0 | 0 | 2.5 Volts ± 2.5 volts |
| 1.5 (+3.5 db) | 0 | 0 | 1 | 2.5 Volts ± 1.7 volts |
| 2.5 (+8.0 db) | 0 | 1 | 0 | 2.5 Volts ± 1.0 volts |
| 3.5 (+11 db) | 0 | 1 | 1 | 2.5 Volts ± 0.7 volts |
| 4.5 (+13 db) | 1 | 0 | 0 | 2.5 Volts ± 0.5 volts |
| 5.5 (+15 db) | 1 | 0 | 1 | 2.5 Volts ± 0.4 volts |
| 6.5 (+16 db) | 1 | 1 | 0 | 2.5 Volts ± 0.35 volts |
| 7.5 (+17.5 db) | 1 | 1 | 1 | 2.5 Volts ± 0.3 volts |

| Receive Modulator | | | | |
| --- | --- | --- | --- | --- |
| Gain | $CR2_5$ | $CR3_4$ | $CR3_4$ | Maximum Operatina Input Range |
| 0.5 (−6 db) | 0 | 0 | 0 | 2.5 Volts ± 2.5 volts |
| 1.5 (+3.5 db) | 0 | 0 | 1 | 2.5 Volts ± 1.7 volts |
| 2.5 (+8.0 db) | 0 | 1 | 0 | 2.5 Volts ± 1.0 volts |
| 3.5 (+11 db) | 0 | 1 | 1 | 2.5 Volts ± 0.7 volts |
| 4.5 (+13 db) | 1 | 0 | 0 | 2.5 Volts ± 0.5 volts |
| 5.5 (+15 db) | 1 | 0 | 1 | 2.5 Volts ± 0.4 volts |
| 6.5 (+16 db) | 1 | 1 | 0 | 2.5 Volts ± 0.35 volts |
| 7.5 (+17.5 db). | 1 | 1 | 1 | 2.5 Volts ± 0.3 volts |

Maximum signal range into the modulator should be kept at 15% to 85% of full scale for best modulator performance. Full scale is defined as the difference of $A_{VDD}$ and $A_{VSS}$. For a 5 Volt system this would reflect to a signal range of 2.5 Volts±2.125 volts. A good practice would be to design for a maximum input of ±2.0 volts to the modulator after the signal has been pre-scaled by the programmable gain input stage. These recommended maximum operating signal ranges for each gain setting are shown in the last column of the tables above.

The modulator output is buffered. This helps to isolate any output signal loading in the digital portion the chip from the modulator itself. Additionally the buffer is driven from $D_{VDD}$ and $D_{VSS}$ so as not to cause any analog supply noise which may get folded back into the analog signal.

Section 2.2—Bitstream Attenuator

Figure 6:
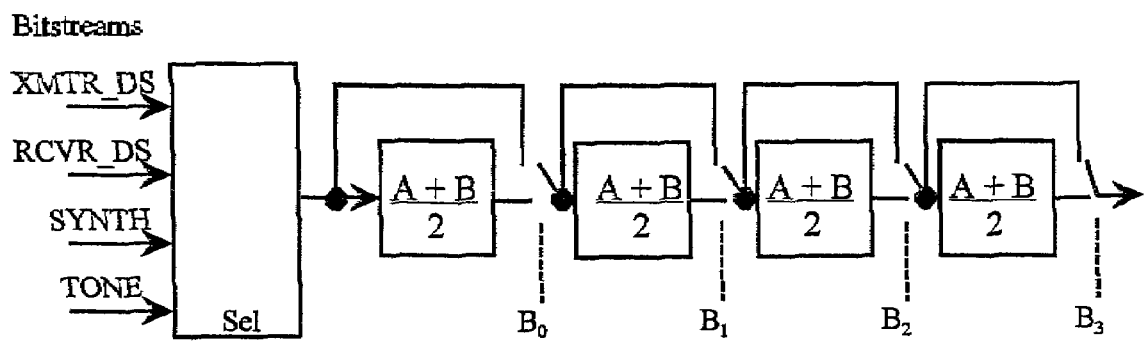
FIG. 6 is a functional block diagram of a bitstream attenuator.

The bitstream Attenuator is comprised of two main components, the signal selection mux and the attenuation circuits; this is shown in block diagram form by FIG. 6. This block is entirely digital. The input signal selection mux is 4-to-1 signal selector and is controlled by select bits $SEL_1$, and $SEL_0$. In the current form of the ICA0000035 only two inputs are required for either the receive circuit or the transmit circuit, however control bits from the imbedded microcontroller are still connected to allow for test features which will allow the bitstreams to be set high or low.

Like the modulator blocks there are one of these blocks for the receive circuit and one for the transmit circuit. The tables below show the available signal selections and their corresponding control register bits for each of the two attenuation blocks.

Transmit Attenuator

| Attenuator Signal | CR4₇/SEL1 | CR4₆/SEL0 | Circuit Signal |
|---|---|---|---|
| Signal 0 | 0 | 0 | TX Modulator |
| Signal 1 | 0 | 1 | RCV Modulator |
| Signal 2 | 1 | 0 | SYNTH from Processor |
| Signal 3 | 1 | 1 | AUX |

Receive Attenator

| Attenuator Signal | CR5₇/SEL1 | CR5₆/SEL0 | Circuit Signal |
|---|---|---|---|
| Signal 0 | 0 | 0 | TX Modulator |
| Signal 1 | 0 | 1 | RCV Modulator |
| Signal 2 | 1 | 0 | Synth from Processor |
| Signal 3 | 1 | 1 | AUX |

The attenuation portion of the circuit produces an output bitstream who's density is the input density times the attenuation gain factor or more explicitly with scaling taken into account, $$V_{OUT} = V_{IN}[GAIN \div 64],$$

where GAIN is the digital value of bits $CR4_{5..0}$ and $CR5_{5..0}$ for the transmit and receive circuits respectively.

There is a slight delay and noise penalty for passing a signal through this attenuation block. Therefore a special case has been provided for which will allow the signal to pass straight through unmodified. This exception to the above gain equation occurs when GAIN=63. According to the formula above the resultant gain would be 63/64. However to allow signals to be 'passed-through' the block additional circuitry has been provided to look for the special case of GAIN=63 and produce a gain value of 1.

It is important to note here that the convention of signal value of zero being a 50% duty-cycled bitstream is maintained. This means that an attenuation of GAIN=0 will produce a bitstream density of 50% not a constant stream of "0's"s.

Section 2.3—Bitstream Adder

FIG. 7 shows a simplified version of the bitstream adder block. The current bit value of the 'A' input is added to the current value of the 'B', input and the remainder from add. There is an arbitrary scaling performed which therefore allows the output to be defined as $$V_{OUT} = (A+B) \div 2.$$

Note that the noise shaping is maintained since the residual is fed back for the next computation and is not thrown away.

In actuality the circuit is a bit more complex than what is shown. In the actual implementation there are two stages of integration (the adder and latch compose a single stage integrator). The integrator bit sizes become multi-bit in nature and add circuits are required to keep these integrators from overflowing. The size that the integrators are allowed to 'wind-up' determines the range of the input signal before clamping. This bitstream adder will allow signals from 10% to 90% before any noise is introduced as a result of clamping.

It should be noted that with the convention of bitstream zero being a 50% duty cycle waveform that the bit stream adder may become a bitstream subtractor simply by inverting the input to be subtracted or for example when the 'B' input is inverted before being input to the bitstream adder the result is:

$$V_{OUT} = (A + \{Invert\ of\ B\}) \div 2,$$

which is equivalent to $$V_{OUT} = (A-B) \div 2.$$

Other than the input clock, which must be at the bit rate, no control registers are required for the bit stream adder.

In the ICA000035 ASIC this bitstream adder is used in two ways. First during normal voice communication a small part of the handset transmit signal is partially nulled out to provide partial sidetone cancellation to the handset receiver. This level can be set by controlling the GAIN input of the transmit bitstream attenuator (see Section 2.2—Bitstream Attenuator).

Secondly this circuit is used when the Protel 65C02 Processor us used as a 300/1200 FSK modem. In this case the entire transmitted signal (carrier) is canceled so that the receive signal may be discriminated carrier free. In this case the phase an magnitude of the transmitted carrier must be exactly matched and subtracted from the receive signal. This requires the use of a delay circuit (to match phase) as well as the bit stream attenuator. (Refer to Section 1.4 Bitstream Delay Circuits and Section 1.5—Bit Stream Comparitor for further details.

Section 2.4—Bitstream Delay

The bitstream delay circuit is intended to provide enough delay in the transmitted modulated DTMF bit stream so as to exactly equal the phase shift experienced by the modulated DTMF bitstream through the output LRC filter. The phase shift will be different from phone installation to phone installation even though the filter remains constant due to different line impedances.

The output of this filter is fed back to the receive input and remodulated. Once the phase is matched it is a simple take to adjust the amplitude to exactly cancel out the original DTMF carrier.

Referring to FIG. 8, the circuit operation is as follows. The input bitstream is fed into a 256 bit shift register. With a one megahertz clock this will provide over 90° of phase shift (well more than what is expected in the field). Each bit of the shift register is then input to a 256 to 1 selector and the eight bit control register input C9(7..0) then selects the appropriate phase shift.

This procedure requires support from the firmware form the phone microprocessor. This delay is set-up once automatically at installation and the need not change any more the control value register however must be stored in the system nonvolatile RAM.

Section 2.5—Bitstream Comparator

Figure 9:
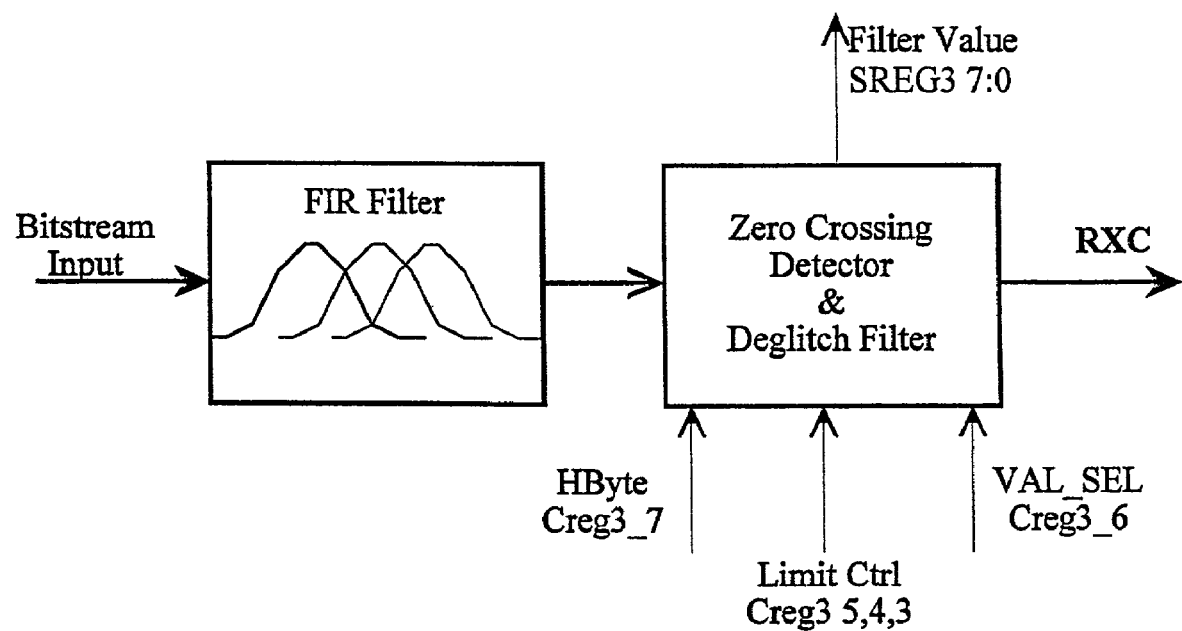
FIG. 9 is a diagram of a bitstream comparator circuit.

FIG. 9 shows the block diagram of the comparator. This block is used to detect the incoming FSK modem signal and well as tone detection. Its bitstream input is fed into a Low pass FIR filter. This filter will pass signals up to 20 KHz but will reject signals and nose above 30 Khz with over 60 db rejection. This filter also maintains the scaling principal set forth for bitstream scaling in that a 50% output value will be equivalent to a 50% a bitstream input.

The FIR filter outputs a 12 bit value and Hbyte control signal will select either the High Byte (Creg3 bit 7 high) or the low Byte (Creg3 bit 7 low) for output on on Filter Value register (Sreg3 bit 7 to 0). The value select input will determine if the Value output is the actual Filter value (CREG3 bit6 high) or the derivative of the value (CREG3 bit 6 low).

The remaining three control bits (Creg3 bits 5,4 & 3) are used for changing the method of deglitching used on the zero crossing detector. Except for very special filtering applications these may be left in the default state. See the register map in section 3 for more details on this functionality.

Section 3:0 Protel PIC CORE—(PPC) Overview

The state machine for the ICA0000035 has been implemented using a microcontroller core. This microcontroller core has been modeled after the Microchip PIC architecture. This core is very similar to the PIC16C56 microcontroller but has been optimized for the Protel application. This section will describe the details of operation of the Protel PIC core.

3.1.0 General Description

The Protel PIC Core (PPC) is a high performance RISC like architecture microcontroller modeled after the Microchip PIC16C56 (PIC) microcontroller. Unlike the PIC the PPC is able to execute all instructions, including program branches, in a single machine cycle. The PPC also differs from the PIC in that a machine cycle is only a single clock whereas the PIC machine cycle is four clocks. Both the PIC and the PPC utilize a 12 bit Data/Instruction Word.

3.1.1 Application

The PPC has been designed specifically to provide an interface between Protel audio circuits fn the ICA0000035 ASIC and the main phone microprocessor. The PPC also provides for General purpose digital I/O for future phone applications. From an I/O point of view the PPC has the following I/O interfaces;

| | |
|---|---|
| Clock Input | Master clock input for PPC. Each instruction executes in one clock period. Max Clock Frequency 20 MHz |
| MRSTN | Master reset - reset the PPC core and initializes all non-general purpose registers. And preset the D/A port to 2.5 volts (Mid Supply) |
| IRQ_IN | IRQ input, edge triggered interrupt input. The PPC is programmable to trigger an interrupt on either edge. The default (initialized upon MRSTN) is negative edge trigger. This interrupt is maskable and is shared with the timer interrupt. |
| 8 bit D/A | Port C of the PPC is mapped to a 8 bit first order Delta Sigma Modulator, its output is a single density modulated bitstream. The minimum duration for a one or zero is one clock cycle. To obtain the analog form of this output a simple 2nd order passive filter is all that is required. More specific details on this output are provided in section 1.4.4. |
| Single-Wire Port | The single-Wire port is in one embodiment a Dallas One Wire protocol compatible interface. This is a Dallas Semiconductor proprietary interface supported by a large number of devices such as silicon serial numbers, distributed I/O, temperature sensors and serial EEROM to mention a few. The implementation of this port is a super set of the Dallas's published protocol and may coexist with other Dallas devices. The Protel 50A ASIC currently has a hardware state machine controlled by the phone's microprocessor which acts as the master Dallas controller on the 1-Wire bus. |
| 3 Digital I/O | In its current configuration three digital I/O lines are available for general purpose use. These lines are controlled by the software. Since they are general purpose in nature their use would require program memory to operate out of the downloadable RAM. DIO2 and DIO1 are configured as an outputs and DIO3 is configures as an input. When Creg1 (R17) bit 4 is high then DIO3 controls the PIC clock When in this state a high on DIO3 rins the CPU at full clock speed; when DIO3 is low it runs at a 61 Hz rate conserving power. |
| 8 PIC Registers | Eight of the internal registers are reserved for the PPC operation. These registers include such things as indiredt addressing register, program counter, status register and register mapped I/O. For more details on register specifics refer to section 3.3.0 "OPERATIONAL REGISTERS". |
| 11 PPC General Purpose Registers | Registers R8 through R15 and Registers R28-R31 are available to the PPC Firmware. See Section 3.4.0 General Purpose Registers" |
| 12 AMX Configuration Registers | Twelve eight-bit configuration registers are supported by the PPC design. These registers are used for configuring operating parameters of the AMX chip that control the phone audio circuits. See section |

Features which have been added, modified or enhanced from the microchip version are:
One clock cycle for all instructions
Internal Timer
Timer interrupt
External interrupt
Built-in Dallas 1-Wire Serial Port
256 Words of Downloadable Program Memory RAM
D/A Port
4 Channel A/D 3.2.0 Architectural Description 3.2.1 Architecture The PPC is a register based architecture in which the instruction 'OPCODE' and 'DATA' share the same memory word and are fetched together. Most instructions use the 'W' or working register for data operations however certain data operation such as bit testing and register to register moves may be performed without the use of the working register. Each instruction opcode is decoded and directs the appropriate data through and on chip ALU to the proper result register. The PPC is comprised of four basic building blocks. The CPU, the ALU the REGISTER/FILE block and TIMER.

3.2.2 Clocking and Execution Scheme

The CPU logic provides all of the PPC instruction decode and control functions. It is responsible for decoding all signal and providing proper file selection addresses and data. It also provides the proper control and data selection for the PPC ALU unit. Instructions are not latched, but rather are permitted to 'ripple through' in a combinatorial manner. This allows for faster speed of operation since it will essentially permit access times of up to one full clock period. The overall approach to the CPU control is to maintain all decode, select and control as combinatorial logic and allow data to 'ripple' through the ALU. Then once everything is settled the result of the instruction (execution) is latched along with the program counter.

3.2.3 ALU

The ALU is also non sequential, allowing for maximum use of the clock bandwidth. The ALU contains both arithmetic as well as logical functions. The ALU is also responsible for determining the state of the status flags for each instruction. In non arithmetic/logical functions such as MOVLW (move literal . . . ) The ALU is used as a data pipeline allowing data to flow through unmodified, but directed to the proper register file input.

3.2.4 REGISTER/FILE Data Registers

The REGISTER/FILE (REGS) block is organized into four types of registered data. The first group is the 'operational' register files. There are eight of these files:

| | |
|---|---|
| f0 | Indirect Data Addressing |
| f1 | Interrupt/Timer Control Register |
| f2 | Program Counter |
| f3 | Status |
| f4 | FSR (File Selection Register) |
| f5 | Port A |
| f6 | Port B |
| f7 | Port C (D/A Port) |

The next group of registers are the general purpose working registers the address space for these are split as follows.

| | |
|---|---|
| f8 | Register 08h |
| f9 | Register 09h |
| f10 | Register 0ah |
| f11 | Register 0bh |
| f12 | Register 0ch |
| f13 | Register 0dh |
| f14 | Register 0eh |
| f15 | Register 0fh |
| f20 | Register 14h |
| f21 | Register 15h |
| f22 | Register 16h |
| f23 | Register 17h |
| f24 | Register 18h |
| f25 | Register 19h |
| f26 | Register 1Ah |
| f27 | Register 1Bh |
| f28 | Register 1Ch |
| f29 | Register 1dh |
| f30 | Register 1eh |
| f31 | Register 1fh |

The third group of registers are the 'read-only'/'write-only' registers. These two sets of registers share the same address space but are physically two separate sets of registers; one for the read-only and the other for the write-only data. They occupy the register/file address space show below:

| | |
|---|---|
| f16 | Read Register 10h |
| f16 | Write Register 10h |
| f17 | Read Register 11h |
| f17 | Write Register 11h |
| f18 | Read Register 12h |
| f18 | Write Register 12h |
| f19 | Read Register 13h |
| f19 | Write Register 13h |

The fourth group of registers are actually part of the CPU and are non addressable registers with control the program flow, these registers are:

| | |
|---|---|
| 1 Program Counter | 9 bits |
| 4 Stack Registers | 10 bits (top bit is a RAM/RAM Flag) |
| 1 Stack pointer | 2 bits |
| 1 Prescale Counter | 5 bits |
| 1 RTC Counter | 8 bits |

3.2.5 Program Memory

The program memory maintains a paged architecture where page 0 is designated as ROM program memory and page 1 is designated as RAM program memory. For the GOTO and CALL instructions the upper address bit (page selection bit—PC(8)) of the PC is set by the page select bit (b5) of the status register. PC(8) for normal program execution assumes its proper incremented value when the PC is simply incremented. (for example—PC=0 ffh will over flow to 100 h if a CALL, GOTO or interrupt is not encountered at 0 ffh.

The lower eight bits of the program counter are determined by the direct setting of the PC by the GOTO, CALL instructions or incrementing during normal program execution. The lower 8 bits of the PC may also be affected indirectly by one of two methods:

1) Direct file operation to Register f2—If a file operation (eg. MOVWF f2) is performed on the program counter register f2 then the results of that operation are loaded into the lower eight bits of the PC.
2) Interrupt—If an interrupt occurs the lower 8 bits of the PC are loaded with the value of the register pointed to by bits 4 though 0 of the interrupt control register f1.

Program ROM is executed when PC(8)='0' and program RAM is executed when PC(8)='1.'

NOTE: This Program Memory Map is significantly different than the PIC in that the PIC uses all nine bits from the GOTO to set PC(8:0) and PC(8)='0' for all CALL operations. This mapping leaves 'memory holes' for CALL operations and is not desirable for our application.

3.3.0 OPERATIONAL REGISTERS

3.3.1 f0 Indirect Data Addressing

This register is not actually implemented but rather signals the CPU that indirect data addressing is to take place. If a file operation is performed with 'f0' as the destination the actual register affected is the register pointed to by bits

4:0 of the file selection register (FSR). Because this register is not physically implemented, an attempt to read to it (by setting FSR=0) will result in '00' for data and a write will be the equivalent of a NOP instruction where no flags or Registers are affected.

3.3.2 f1 Interrupt/Control Register

Bits 4:0 of this register provide the pointer to the register which contains the lower eight bits of the interrupt vector. Bit 5 of this register is the page select bit for the interrupt vector PC(8), Bit 6 contains the interrupt enable status ('1'=interrupt enable, '0' =interrupt disable{default state}). Bit 6 is automatically set to '0' when an interrupt is detected. Bit 7 of this register is unused.

3.3.3 f2 Program Counter (PC)

The program counter register f2 is actually the bottom eight bits of the PC mapped into the PPC register address space. Read operations on f2 will return PC(7:0). Write operations to register f2 will place the result into the lower eight bits of the PC. The PC register is normally incremented after each instruction is executed, exceptions to this are as follows:

```
BranchInstructions -    PC(7:0)  <= [PC + 2](7:0)  <== Page Offest
                        PC(8)    <= [PC + 2](8)    <== Page Select
   BTFSS
   BTFSC
   INCFSZ
   DECFSZ
DirectWritestof2 -      PC(7:0)  <= New computed value of f2
                        PC(8)    <= PC(8) (unaffected)
   ALL Byte oriented
   file register operations
   with f2 as destination.
CALLInstruction -       PC(7:0)  <= INSTR(7:0)
                        PC(8)    <= Status(5)
GOTOInstruction-        PC(7:0)  <= INSTR(7:0)
                        PC(8)    <= Status(5)
RETLW -                 PC(8:0)  <= Current Stack(8:0)
Interrupt(RTC/EXT)      PC(7:0)  <= Fx(7:0) where 'x' is register
                                     pointed to by bit 4:0 of f1.
                        PC(8)    <= f1(5)
```

3.3.4 f3 Status Register

Preassigned bits of the status register are mapped to current CPU status information. The bit assignment is as follows:

```
Status(7)   unused
Status(6)   interrupt enable flag
Status(5)   PC(8) for CALL and GOTO Instructions
Status(4)   unused
Status(3)   unused
Status(2)   Z Flag
Status(1)   DC Flag
Status(0)   C Flag
```

Status information is pushed into a status holding register when an interrupt occurs. This allows transparent saving of all pre-interrupt status information. This Status holding register is NOT readable. The Status register is restored with the value of the Status holding register when a RETLW instruction is executed at the end of an interrupt routine. The Status register is unaffected by a RETLW from within a CALLed subroutine.

3.3.5 f4 File Selection Register (FSR)

This register may be used to as a pointer to an indirect register address for instructions that designate f0 as a destination. Bits 4:0 contain the address of one of the 32 file registers and a file operation with f0 as a destination will use the register who's address is FSR(4:0). Bits 7:5 are unused and may be used for program specific flags. If indirect addressing is not used this register may be used as a general purpose register.

FSR is pushed into an FSR holding register when an interrupt occurs. This allows transparent saving of the pre-interrupt FSR value. The FSR holding register is NOT readable. The FSR register is restored with the value of the FSR holding register when a RETLW instruction is executed at the end of an interrupt routine. The FSR register is unaffected by a RETLW from within a CALLed subroutine.

3.3.6 f5 PortA f5 PortA is a bidirectional tristateable port. All but three of these bits are dedicated for ICA0000035 ASIC specific functions. The mapping is as follows:

```
PortA (7)    Dallas 1-wire input
PortA(6:4)   General Purpose Bidirectional/Tristateable I/O
PortA(3:0)   Upper Program Data Bits (11:8) for Program RAM Write
             operations.
```

3.3.7 f6 PortB f6 PortB is a bidirectional tristateable port. All bits are dedicated for ICA0000035 ASIC specific functions. The mapping is as follows:

PortB(7:0) Lower Program Data Bits (7:0) for Program RAM Write operations.

If program RAM is not used this register may be used as a general purpose internal working register. This may also be done after program RAM data has been successfully downloaded into the on chip program RAM.

3.3.8 f7 PortC f7 PortC is a reserved port which is mapped to the Delta Sigma D/A converter. The eight bit value loaded into this register is first-order-modulated into a bitstream, which when filtered will produce an analog value proportional to the current value of f7 PortC. The filtered analog value will be determined by equation 1 below:

$$V_{out} = V_{supply}(1 - (PortC_{value}/255)). \tag{1}$$

3.4.0 General Purpose Registers

3.4.1 Register Mapping

The general purpose registers are read/write registers which can be used for general program data space. The PPC has 16 such registers divided into two address ranges:

```
Reg08 through Reg15    file addresses    08H through 0FH
Reg29 through Reg31    file addresses    1DH through 1FH
```

3.5.0 AMX Configuration Registers

The Table on the next few pages describe the register mapping of all registers including the registers R8 through R31 which are used by the AMX circuit for configuration and status reporting.

| REGISTER | BIT(s) | FUNCTION | Initial Value | COMMENT |
|---|---|---|---|---|
| Ref0 (x00h) | D7..D0 | Indirect Addressing | "xxxxxxxx" | Not a real register |
| Reg1 (x01h) | D7..D0 | Interrupt Vect Ptr | "00001111" | |
| | D7..D6 | Unused Bits | "00" | |
| | D5 | PC(8) during Interrupt | "0" | '0' => ROM, '1' => RAM |
| | D4..D0 | Points to register with value for PC(7:0) | "01111" | |
| Reg2 (x02h) | D7..D0 | Program Counter | "00000000" | PC(7:0) |
| Reg3 (x03h) | D7..D0 | Status Word Register | "00011000" | |
| | D7..D6 | Unused | | |
| | D5 | PC(8) CALL or GOTO | "0" | '0' => ROM, '1' => RAM |
| | D4..D3 | Unused | | |
| | D2 | Zero Flag | "0" | '1' => Last operation produced a '0' result |
| | D1 | Digit Carry Flag | "0" | '1' => Last operation resulted in a carry from Fx(3) to Fx(4) |
| | D0 | Carry Flag | "0" | '1' => last operation resulted in a carry from Fx(7) to Carry bit |
| Reg4 (x04h) | D7..D0 | File Select Register | "00000000" | Indirect Addr. Register |
| | D7..D5 | Unused | "000" | |
| | D4..D0 | Points to register with value for PC(7:0) when F0 is specified as the file register | "00000" | |
| Reg5 (x05) | D7..D0 | (See Below) | "zzzzzzzz" | PIC PORTA |
| | D7 | TxRx Output Pine | 'z' | |
| | D6 | DIO3/PIC CLK Ctrl | | When Bit4 of R17 is '1' DIO3 = '1' => CLK=CLK '0'=> CLK=CLK/65536 |
| | D5 | DIO2 | | General Purpose Out |
| | D4 | DIO1 | | General Purpose Out |
| | D3..D0 | D11..D8 for RAM | | Used during RAM fill |
| Reg6 (x06h) | D7..D0 | D07..D0 for RAM | "00000000" | PIC PORTB |
| Reg7 (x07h) | D7..D0 | PORTC | "10000000" | MODout - Dsout - 1pin |
| Reg8 (x08h) | D7..D0 | General Purpose Reg. | "xxxxxxxx" | Not initialized |
| Ref9 (x09h) | D7..D0 | General Purpose Reg. | "xxxxxxxx" | Not initialized |
| Reg10 (x0Ah) | D7..D0 | General Purpose Reg. | "xxxxxxxx" | Not initialized |
| Reg11 (x0Bh) | D7..D0 | General Purpose Reg. | "xxxxxxxx" | Not initialized |
| Reg12 (x0Ch) | D7..D0 | General Purpose Reg. | "xxxxxxxx" | Not initialized |
| Reg13 (x0Dh) | D7..D0 | General Purpose Reg. | "xxxxxxxx" | Not initialized |

-continued

| REGISTER | BIT(s) | FUNCTION | Initial Value | COMMENT |
|---|---|---|---|---|
| Reg14 (x0Eh) | D7..D0 | General Purpose Reg. | "xxxxxxxx" | Not initialized |
| Reg15 (x0Fh) | D7..D0 | General Purpose Reg. | "xxxxxxxx" | Not initialized |
| Reg16 (x10h) | D7..D0 | Real Time Clock (RTC) | "11111111" | RTC counts UP |
|  | D7..D0 | Write puts invert of file data in RTC |  |  |
|  | D7..D0 | RTC Current Count |  | Read Only |
| Reg17 (x11h) | D7..D0 | W_ONLY_R1 CREG1 | "11101010" | System config. register Write Only CREG1 |
|  | D7,D6 | Tone CTRL(1:0) CREG1 | "11" | 11 = No Tone out<br>10 = Tone_1 out<br>01 = Tone_0 out<br>00 = Dual Tone (DTMF) |
|  | D5 | Tone CLK Select | '1' | 1 = CLK/4; '0' = CLK |
|  | D4 | PIC_CTRL_CLK | '0' | 0 = TxRx Control<br>1 = DIO3 Control (RS) |
|  | D3 | RTC_EN | '1' | 1 = Enabled |
|  | D2 | IRQ_EDG | '0' | 0 = IRQ on neg. edge |
|  | D1 | EXT_IRQ_EN | '1' | 1 = Enable EXT IRQ |
|  | D0 | RTC_IRQ_EN | '0' | 0 = Disable RTC IRQ |
| Reg17 (x11h) | D7..D0 | Interrupt Flags | N/A | Read only data SREG1 |
| Reg17 (x11h) | D7..D2 | Unused | N/A | Read only data SREG1 |
| Reg17 (x11h) | D1 | Ext_IRQ Flag | N/A | Read only data SREG1 |
| Reg17 (x11h) | D0 | RTC_IRQ Flag | N/A | Read only data SREG1 |
| Reg18 (x12h) | D7..D0 | Preamp Control | "01001001" | Write only data CREG2 |
|  | D7,D6 | Tx_Mux_Sel | "01" | '00' sel XMTR<br>'01' sel DTMF<br>'10' sel MODEM<br>'11' sel AUX |
|  | D5..D3 | TX_GAIN(2:0) | '001' | Gain = B(2:0) + .5 |
|  | D2..D0 | RCV_GAIN | '001' | Gain = B(2:0) + .5 |
| Reg18 (x12h) | D7..D0 | A/D Compare & Security Code | "xxxxxxxx" | (Read Only Register) SREG2 |
|  | D7 | A/D comparitor out | N/A | COMP input-Read Only |
|  | D6 | Unused |  |  |
|  | D5..D0 | Security Code |  | 1 of 64 codes programmed at time of chip bonding |
| Reg19 (x13h) | D7..D0 | Limiter & Bitstream Control | "01011010" | Write Only - CREG3 |
|  | D7 | FIR_HBYTE | '0' sel HB | Write Only |
|  | D6 | FIR_SEL | '1' sel FIR | Write Only; '0' sel delta |
|  | D5 | LIM_SEL | '0' use FIR | Write Only; '0' use PIC |

-continued

| REGISTER | BIT(s) | FUNCTION | Initial Value | COMMENT |
|---|---|---|---|---|
| | D4 | DGLTCH_SEL | '1' use deglitch cir | Write Only '0' use lim directly |
| | D3 | Txout MUX Control | '1' sel attn | Write Only- '0' sel MOD |
| | D2 | RxC_SEL | '0' use MOD | Write Only-'1' use RX |
| | D1 | 180_Phase_SEL | '1' Bitstrm x 180 deg | Write Only- '0' No phase shift |
| | D0 | Side_Tone Control | '0' selects Side Tone | Write Only '1' RX on, no sidetone |
| Reg19 (x13h) | D7..D0 | FIR Output | N/A | Read Only |
| R20 (x14h) | D7..D0 | XMTR Attenuator Ctrl | "00111111" | CREG4 - R/W Reg |
| | D7,D6 | Signal Selection | '00' sel XMTR | '01' select RCV mod '10' select SYNTH '11' select TONE Gen |
| | D5..D0 | Bitstream Attenuation | '111111' | Attn=B(5:0)/64 |
| R21 (x15h) | D7..D0 | XMTR Attenuator Ctrl | "00111111" | CREG5 - R/W Reg |
| | D7,D6 | Signal Selection | '01' sel RCV mod | '00' select XMTR mod '10' select SYNTH '11' select TONE Gen |
| | D5..D0 | Bitstream Attenuation | '111111' | Attn=B(5:0)/64 |
| R22 (x16h) | D7..D0 | Delay Register | "00000001" | CREG6, R.W Register Delay =B(7:0) us |
| R23 (x17h) | D7..D0 | Clock Control Reg | '11111110' | CREG7, R/W Register |
| | D7 | Unused | | |
| | D6 | Modulator Clock En | '1' enable | |
| | D5 | TX Attenuator Clock | '1' enable | |
| | D4 | RCV Attenuator Clock | '1' enable | |
| | D3 | Bitstream adder Clock | '1' enable | |
| | D2 | FIR Clock enable | '1' enable | |
| | D1 | Delay Clock enable | '1' enable | |
| | D0 | Tone Generator Clock | '0' Disable | |
| R24 (x18h) | D7..D0 | Tone 0 Ampl. Control | Not set | CREG8, R/W Register AMPL = B(7:0)/256 |
| R25 (x19h) | D7..D0 | Tone 1 Ampl. Control | Not set | CREG9, R/W Register AMPL = B(7:0)/256 |
| R26 (x2Ah) | D7..D0 | Tone0 Freq control | Not Set | CREGA, R/W Register Freq= 895KHz / 25.13·(N+1) |
| R27 (x2Bh) | D7..D0 | Tone0 Freq control | Not set | CREGB, R/W Register FREQ = 895 KHz / 25.13·(N+1) |

-continued

| REGISTER | BIT(s) | FUNCTION | Initial Value | COMMENT |
|---|---|---|---|---|
| R28 (x2Ch) | D7..D0 | A/D Sig Sel & PIC LIM | Not Set | CREGC, R/W Register |
|  | D7..D3 | Unused |  |  |
|  | D2 | PIC LIM Circuit | Not Set |  |
|  | D1:D0 | Signal Selection | Not Set | '00' Select Ain0 |
|  |  |  |  | '01' Select Ain1 |
|  |  |  |  | '10' Select Ain2 |
|  |  |  |  | '11' Select Ain3 |
| R29 (x2Dh) | D7..D0 | General Purpose Reg | Not set | CREGD, R/W Register |
| R30 (x2Eh) | D7..D0 | General Purpose Reg | Not Set | CREGE, R/W Register |
| R31 (x2Fh) | D7..D0 | General Purpose Reg | Not set | CREGF, R/W Register |

3.5.0 Special Purpose Registers 3.5.1 W Register

The 'W' Register in the PPC acts an accumulator and holds the second operand in two operand operations. In file register operations the W register may be specified as the destination rather than the file itself. This allows a file operation result to be used as a second operand in the following instruction and allows the original file value to remain unmodified. The W register is pushed onto a temporary holding register after an interrupt and will be restored automatically when a RETLW instruction is executed at the end of an interrupt routine. The W register is also used as the Program RAM address during Program RAM write operations.

NOTE: This means that the value of W specified in the RETLW instruction, when issued at the end of an interrupt routine, will be ignored.

3.5.2 TRISx Registers

Two register not in the register map are provided which control the tristate state of Ports A and B. Both of these registers are eight bit with each bit corresponding to the tristate control line on the respective port bit. A bit value of logic 1 will tristate the appropriate port bit and allow that port bit to be used as an input. PortA bits 3:0 and PortB bits 7:0 must be configured as outputs when modifying program RAM.

3.5.3 Stack Pointer

A two bit stack pointer register is provided to keep track of the current stack level. The stack level is incremented each time an interrupt occurs or a CALL instruction is executed. The stack pointer register is decremented each time a RETLW instruction is executed. A stack pointer value of "00" indicates that program execution is in the main program code and not in any called subroutines or interrupt service routines. The max level of the stack is 3 this allows interrupts to be enabled in subroutines and still be able to call a subroutine from within an interrupt service routine.

3.5.4 Stack Registers—Stack1, Stack2, Stack3

The Stack registers are ten bit registers, the lower nine bits store the current value of the PC+1 (which is a 9 bit value). The upper bit of each Stack registers stores a flag which indicates whether the program branch was caused by a CALL instruction or an interrupt. If the program branch was initiated by a CALL instruction then the 10th bit StatusX(9) of StackX is cleared. If the program branch was initiated by an interrupt (external or timer) then the StatusX(9) bit is set.

This flag bit (when set) is used when a RETLW is executed to signal the control circuits to restore the FSR, Status and W registers to their pre-interrupt values. If the flag bit is cleared when a RETLW is executed the W value specified in the RETLW operand is loaded into W and the Status and FSR registers are left unchanged.

3.5.5 Prescale Counter Register

The Prescale Counter register is a 5 bit divide by 18 counter. It is preset by MRSTN or an overflow of the prescale counter. Setting the RTC_EN bit (B3 of f17) will also preset the Prescale register to its initial value. The overflow of the prescale register is used as a timer TIC for the main RTC counter. Using a color burst crystal of 3.579 MHz produces a TIC time of approximately 5 us.

NOTE: The prescale register is NOT settable (other than resetting it with RTC_EN) and it is not readable.

3.5.6 f16 (10h) Real Time Counter (RTC) Register

The realtime counter is an eight bit counter initialized to 00 h upon power-up and once enabled it will produce wrap around every 256 TIC times. Thus for a 3.579 MHz clock the max timer over flow time will be 1.28 ms. If interrupts are enabled an interrupt will occur each time the RTC counter overflows. The current value of this register may be read by reading the read only port from file register f16.

The RTC may be set to produce shorter roll over times simply by writing to the write only RTC register, at file register write address space f16. The number of Prescale TICs to produce an overflow is given by N+1 where N is the value loaded into the write only RTC register. Once a value is written to file register f16 the RTC Register may be loaded in one of three ways.

First if RTC is already enabled loading a new count value into F16 will not take effect until the current value in the RTC has completed timing out. Thus if the lat value in RTC was set to 1 ms and the new value is set to 0.5 ms the RTC will complete the 1 ms time out before setting itself for the new 0.5 ms value.

Secondly, if the RTC is already enabled and it is desired that the new value take effect immediately (next Prescale TIC) then a CLRWDT instruction may be issued and the new value will start timing immediately.

Finally, if RTC is not enabled and a new timer value is loaded by writing f16 the new time will start timing on the next rising clock edge of the system clock. Enabling the RTC also reinitializes the Prescale counter register.

3.5.7 f17 (11h) RTC and IRQ Control/Status Register

File register f17, address 11h, provides control and status information for the RTC and IRQ circuits. This address actually contains two separate 4 bit registers. One is read only which provides status information, the other is write only which provides control information for the RTC and IRQ circuits. If this read only register (f17) is accessed, two bits of information are provided as shown by the port map below:

| | |
|---|---|
| f17(3) | '0' |
| f17 (2) | '0' |
| f17 (1) | EXT_IRQ flag ('1' = external interrupt has occurred) |
| f17 (0) | RTC_IRQ flag ('1' = RTC overflow has occurred) |

NOTE: Reading this port will clear both flags. (See Interrupt operation for further details)

If the write only register (f17) is modified, then action is taken according to the bit map show below:

| | |
|---|---|
| f17 (3) | RTC_EN ('1' enables RTC and starts timer) |
| f17 (2) | IRQ_EXT_EDG ('0' sets IRQ to occur on falling edge) |
| f17 (1) | IRQ_EXT_EN ('1' enables external interrupts |
| f17 (0) | IRQ_RTC_EN ('1' enable RTC to interrupt CPU upon overflow), | all bits in both the registers are initialized to '0' on power-up (MRSTN='0').

3.6.0 Interrupts

3.6.1 General Interrupt Overview

Two methods of interrupting the PPC are provided, external-edge-triggered and real time counter overflow. Both of these signals share the same internal interrupt. If both are enabled then if either signal occurs the CPU is interrupted and vectored to a predetermined interrupt handling routine. A register is provided which can be read to find out which interrupt occurred. Either or both of the interrupts may be disabled.

The CPU has a separate master IRQ enable which will globally disable or enable IRQ activity. This is controlled by Bit6 of the Interrupt Control Register f01 (01h). If this bit is set, interrupts are enabled, if it is cleared interrupts are disabled. Each time an interrupt occurs the CPU automatically disables interrupts by clearing this bit; this prevents additional interrupts from occurring until the present one has been properly handled. The user must re-enable interrupts by setting this bit before any other interrupts can occur. The user must also read the RTC/IRQ status register f17 (11h) before reenabling the CPU interrupt or another interrupt will occur.

When an interrupt occurs the current instruction is executed and the next instruction will be an internally generated IRQ instruction. This internally generated IRQ instruction takes one clock cycle just like all other PPC instructions. The following actions occur as part of the IRQ instruction:

1) No status flags are affected.
2) The current Status, W and FSR registers are pushed onto temporary holding registers and are restored when a RETLW is issued at the end of an interrupt handling service routine.
3) The stack level pointer is incremented by one.
4) The current PC value+1 is placed in the proper stack register. The interrupt flag bit of this stack register is set (StackN(9)='1') to indicate to the RETLW instruction that the return is from an interrupt and not a CALL.
5) PC(7:0) is loaded with the value of the register pointed to by bits 4:0 of the Interrupt Control Register f01 (01h) and the ROM/RAM selection bit PC(8) is set to the value specified by Bit5 of the Interrupt Control Register f01 (01h).
6) The CPU interrupt enable bit, Bit6 of the Interrupt Control Register f01 (01h), is cleared.

Prior to returning from an IRQ service routine the following must be done to allow further interrupts to occur:

1) Read IRQ status word f17(11h); this will clear both IRQ flags. If this is not done another interrupt will occur as soon as interrupts are re-enabled.
2) Re-enable the CPU interrupt by setting Bit6 of the Interrupt Control Register f01(01h).

After an interrupt has been serviced a RETLW is issued and the following actions are taken as part of the RETLW execution:

1) The current Status, W and FSR registers are restored to their pre-interrupt values.
2) The current PC(8:0) is loaded with StackN(8:0).
3) The stack level pointer is decremented by one.
4) Program execution continues from where it left off prior to the interrupt.

The CPU interrupt is asserted whenever either the RTC or EXT interrupt occurs. The RTC interrupt occurs when the RTC times out from its preset value. The EXT interrupt occurs when a signal on pin IRQ of the ICA0000035 ASIC transitions. This can be configured to occur on the rising or falling edge of the IRQ input pin. This is accomplished by writing Bit 2 of the RTC/IRQ control register (f17 {11h}); a '1' in this bit position configures the circuit for rising edge trigger and a '0' configures it for falling edge.

The enables for the RTC and external interrupts are controlled separately by writing to the RTC/IRQ control register (f17 {11h}). Setting Bit 0 of this register enables the RTC interrupt and setting Bit 1 enables the external interrupt.

The RTC may be separately enabled and disabled independent of the state of the RTC_IRQ enable. This is accomplished by writing Bit 3 of the RTC/IRQ control register (f17 {11h}). Disabling the RTC and re-enabling will cause the RTC to be reloaded with the preset value stored in file register f16. This architecture would thus allow a software Watch Dog Timer to operate simply by having the main program disable and re-enable the RTC at a rate faster than that which is set into the RTC register.

Section 4.0—Electrical Specifications

Electrical Specifications (Conditions DVDD=+2.7 to +5.5 Volts; AVDD=4.5 to 5.5 Volts; AVSS=DVSS=0.0 Volts; $T_a=_{MIN}$ to $T_{MAX}$;

$C_{LOAD}$=50 pf, unless otherwise noted)

| Parameter | Notes | Symbol | Min | Typ | Max | Units |
|---|---|---|---|---|---|---|
| ANALOG CHARACTERISTICS | | | | | | |
| Accuracy | | | | | | |
| Gain error | 1 | Error$_{GAIN}$ | −10 | ±2 | +10 | % |
| Gain Drift | | | −50 | ±10 | +50 | ppm/° C. |
| Offset Error | | V$_{OFFSET}$ | −15 | ±5 | +15 | mV |
| Offset Drift | | | −50 | ±10 | +50 | μV/° C. |
| Output Noise | 2 | | | | 1 | μV$\sqrt{}$/Hz$^{-1/2}$ |
| I$_{DD}$ Analog | 3 | | — | 1.5 | 2 | ma |

NOTES:
1 Even though this specification specifies all Gains in db the error specification is absolute. Specifically it is the expected gain minus the actual gain expressed as a percentage of the expected gain.
2 Output noise is expressed as noise density (RMS) as should be at 100 Hz or below.
3 I$_{DD}$ Analog measured with A$_{VDD}$ = 5.5 volts DC. Note that specified current is over temperature.

Electrical Specifications
(Conditions DVDD=+2.7 to +5.5 Volts; AVDD=4.5 to 5.5 Volts; AVSS=DVSS=0.0 Volts; T$_a$=$_{MIN}$ to T$_{MAX}$; C$_{LOAD}$=50 pf, unless otherwise noted)

| Parameter | Notes | Symbol | Min | Typ | Max | Units |
|---|---|---|---|---|---|---|
| DIGITAL CHARACTERISTICS | | | | | | |
| Digital Inputs | | | | | | |
| Input Low Voltage Threshold | 1 | V$_{IL}$ | 0.3 | 0.5 | 0.4 | Vdd |
| Input High Voltage Threshold | 1 | V$_{IH}$ | 0.6 | 0.5 | 0.7 | Vdd |
| Input Current | 2 | I$_{IL\&H}$ | — | ±1 | ±10 | μA |
| Input Capacitance | | C$_{IN}$ | — | ±5 | ±10 | pF |
| I$_{DD}$ Digital | 3 | | — | 100 | 200 | μA |

Notes:
1 Input threshold levels are expressed as a multiple of DVDD to account for the wide range of allowable supply voltage.
2 These current levels are for valid input levels only.
3 I$_{DD}$ Digital measured with D$_{VDD}$ = 5.5 volts DC. Note that specified current is over temperature. Current measurement is made with input clock frequency = 500 Khz.

Section 5.0—Summary and Conclusion

It will be understood by those skilled in the art that various modifications and changes may be made in the design of the integrated circuit configurations and methods described above without departing from the spirit and scope of the present invention. For example, a number of register MAP and PIC microcode configurations will be generally known to those skilled in the art. However, specific formats are disclosed in Appendix A and D, respectively, in the above-identified provisional application, which are incorporated herein by reference. Further, to the extent that the skilled artisan is interested in determining differences between the particular PIC configuration of the present invention with other commercially available designs, such information may be found at Appendix B to the above-identified provisional patent application; likewise, Appendix C of the provisional application contains a description of a one-wire protocol. Both Appendix B and C are also incorporated herein by reference. There is of course significant additional information which will be readily available to those skilled in the art in practicing these inventions, which is not incorporated herein for purposes of brevity.

What is claimed is:

1. An integrated circuit for use in a public telephone to provide standard telephone functions, the integrated circuit comprising:
   first channel means for providing a transmit multiplexing control;
   second channel means for providing a receive multiplexing control; and
   serial user interface means electronically coupled with the first and second channel means, the user interface means compatible with a single-wire timing protocol.

2. The integrated circuit recited in claim 1, further comprising:
   means for providing a digital/analog delta-sigma bitstream output from the integrated circuit; and wherein the bitstream has an analog value written via the serial single-wire user interface means.

3. The integrated circuit recited in claim 1, further comprising programmable interrupt controller means embedded in the integrated circuit.

4. The integrated circuit recited in claim 3, wherein the programmable interrupt controller means comprises:
   means for providing digital control; and
   means for monitoring analog measurements and the first and second channel means.

5. The integrated circuit recited in claim 1, further comprising digitally programmable gain control means.

6. The integrated circuit recited in claim 1, further comprising multiple analog audio input means.

7. The integrated circuit recited in claim 6, wherein said analog audio input means comprises at least four such inputs.

8. The integrated circuit recited in claim 1, further comprising dual audio output means.

9. The integrated circuit recited in claim 1, further comprising means for cancelling undesirable audio and frequency shift keying side band components.

10. The integrated circuit recited in claim 1, further comprising means for providing signal selection and gain control for plural audio frequency, digital and analog inputs.

11. An integrated circuit for use in a public telephone to provide standard telephone functions, the integrated circuit comprising:
   first channel means for providing a transmit multiplexing control;
   second channel means for providing a receive multiplexing control;
   means for providing analog inputs to the second channel means;
   means for converting the analog inputs into a bitstream format; and
   means for scaling the converted analog inputs.

12. The integrated circuit recited in claim 11, wherein the means for scaling comprises an internal programmable gain switched capacitor amplifier.

13. The integrated circuit recited in claim 11, wherein the means for converting the scaled audio inputs into a bitstream format comprises a delta sigma modulator circuit.

14. A method for controlling standard functions in a public telephone, comprising the steps of:
   providing an integrated circuit;
   configuring the integrated circuit with first channel means for providing a transmit multiplexing control and second channel means for providing a receive multiplexing control for audio inputs;

configuring the integrated circuit to include both audio and single bit bitstream inputs.

15. An integrated circuit for use in a public telephone to permit and control standard telephone functions, the integrated circuit comprising:

two channels of audio control, including a first channel functioning as a transmit multiplexing control and the second channel functioning as a receive multiplexing control;

means for converting the analog inputs into a single bit bitstream; and means for scaling the converted analog inputs to the first and second channels.

16. The integrated circuit recited in claim 15 wherein the means for scaling the analog inputs to the first and second channels comprises an internal programmable gain switched capacitor amplifier.

17. The integrated circuit recited in claim 16 wherein the means for converting the analog inputs into a bitstream format comprises a delta-sigma modulator.

18. The integrated circuit recited in claim 17 further comprising single-wire interface means for providing control over the converted bitstream format.

* * * * *